(12) United States Patent
Liu et al.

(10) Patent No.: US 8,950,674 B2
(45) Date of Patent: *Feb. 10, 2015

(54) APPARATUS FOR AND METHOD OF IMAGING TARGETS WITH A HYBRID IMAGING LENS ASSEMBLY

(71) Applicant: Symbol Technologies, Inc., Schaumburg, IL (US)

(72) Inventors: Rong Liu, Centereach, NY (US); Vladimir Gurevich, Stony Brook, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/898,569

(22) Filed: May 21, 2013

(65) Prior Publication Data

US 2014/0346230 A1 Nov. 27, 2014

(51) Int. Cl.
*G06K 7/10* (2006.01)
*G06K 7/14* (2006.01)
*G02B 13/00* (2006.01)

(52) U.S. Cl.
CPC .......... *G06K 7/10831* (2013.01); *G02B 13/004* (2013.01)
USPC .................. 235/454; 235/462.41; 235/462.42

(58) Field of Classification Search
CPC .... G02B 15/177; G02B 15/173; G02B 13/18; G02B 13/004; G02B 13/0035; G02B 5/005; G02B 7/003; G06K 7/10722; G06K 7/10831; G06K 7/10702; G06K 7/10732; G06K 7/10851; G06K 7/10712

USPC .......... 235/454, 375, 462.11, 462.24, 462.35, 235/462.41, 462.43

See application file for complete search history.

(56) References Cited

U.S. PATENT DOCUMENTS

| | | | |
|---|---|---|---|
| 5,900,987 A | 5/1999 | Kreitzer | |
| 5,963,375 A | 10/1999 | Kreitzer | |
| 6,731,434 B1 | 5/2004 | Hua et al. | |
| 7,446,954 B2 * | 11/2008 | Sun | 359/773 |
| 8,624,985 B2 | 1/2014 | Vinogradov et al. | |
| 2005/0231817 A1 * | 10/2005 | Matsusaka et al. | 359/680 |
| 2007/0115561 A1 * | 5/2007 | Chuang et al. | 359/687 |
| 2009/0201591 A1 * | 8/2009 | Yamasaki | 359/687 |
| 2009/0321618 A1 * | 12/2009 | Ohara et al. | 250/227.2 |
| 2013/0063828 A1 * | 3/2013 | Hirao et al. | 359/718 |

FOREIGN PATENT DOCUMENTS

EP 1380872 A2 1/2004
KR 10-0570392 B1 4/2006

(Continued)

*Primary Examiner* — Edwyn Labaze
(74) *Attorney, Agent, or Firm* — Nong-Qiang Fan

(57) ABSTRACT

An imaging lens assembly captures return light from a target, and projects the captured light onto a solid-state imager during electro-optical reading of the target. One plastic lens and one glass lens, together having a relatively low negative optical power, are situated at one side of an aperture stop. Another plastic lens and another glass lens, together having a relatively high positive optical power, are situated at the opposite side of the aperture stop. An aperture extends along an optical axis through the opposite sides. Each plastic lens is configured with opposite aspheric nearly concentric surfaces to widen and flatten the field of view of the imager, and to reduce sensitivity to manufacturing and assembly tolerances. A holder holds the lenses and the aperture stop in spaced relation along the optical axis relative to the imager.

18 Claims, 3 Drawing Sheets

(56) References Cited

FOREIGN PATENT DOCUMENTS

| WO | 9926090 | A1 | 5/1999 |
| WO | 9935517 | A2 | 7/1999 |
| WO | 03085437 | A2 | 10/2003 |
| WO | 2006017383 | A2 | 2/2006 |

* cited by examiner

APPARATUS FOR AND METHOD OF IMAGING TARGETS WITH A HYBRID IMAGING LENS ASSEMBLY

FIELD OF THE DISCLOSURE

The present disclosure relates generally to an apparatus for, and a method of, electro-optically reading targets by image capture and, more particularly, to a wide angle, athermalized, achromatic, hybrid imaging lens assembly having plastic and glass lenses for capturing return light from a target over a field of view of a solid-state imager of an imaging reader, and for projecting the captured return light onto the imager during reading of the target and, still more particularly, to configuring each plastic lens with opposite aspheric nearly concentric surfaces to widen and flatten the field of view of the imager, and to reduce sensitivity to manufacturing and assembly tolerances.

BACKGROUND

Solid-state imaging apparatus or imaging readers, that have been configured either as handheld, portable scanners and/or stand-mounted, stationary scanners each having a presentation window, or as vertical slot scanners each having a generally vertically arranged, upright window, or as flat-bed or horizontal slot scanners each having a generally horizontally arranged window, or as bi-optical, dual window scanners each having both generally horizontally and vertically arranged windows, have been used in many venues, such as supermarkets, department stores, and other kinds of retailers, libraries, parcel deliveries, as well as factories, warehouses and other kinds of industrial settings, for many years, in both handheld and hands-free modes of operation, to electro-optically read by image capture a plurality of symbol targets, such as one-dimensional symbols, particularly Universal Product Code (UPC) bar code symbols, and two-dimensional symbols, as well as non-symbol targets, such as driver's licenses, receipts, signatures, etc., the targets being associated with, or borne by, objects or products to be processed by the imaging readers. In the handheld mode, a user, such as an operator or a customer, held the imaging reader and manually aimed a window thereon at the target. In the hands-free mode, the user slid or swiped a product associated with, or bearing, the target in a moving direction across and past a respective window in a swipe mode, or momentarily presented the target associated with, or borne by, the product to an approximate central region of the respective window, and steadily momentarily held the target in front of the respective window, in a presentation mode. The choice depended on the type of the reader, or on the user's preference, or on the layout of the venue, or on the type of the product and target.

The imaging reader included a solid-state imager (also known as an imaging sensor) with a sensor array of photocells or light sensors (also known as pixels), which corresponded to image elements or pixels over a field of view of the imaging sensor, and an imaging lens assembly for capturing return light scattered and/or reflected from a target being imaged over a working range of distances, and for projecting the return light onto the imaging sensor to initiate capture of an image of the target as pixel data. The imaging sensor was configured as a one- or two-dimensional charge coupled device (CCD) or a complementary metal oxide semiconductor (CMOS) device, and included associated circuits for producing and processing an electrical signal corresponding to a one- or two-dimensional array of the pixel data over the field of view. The imaging sensor was controlled by a controller or programmed microprocessor that was operative for processing the electrical signal into data indicative of the target being imaged and, when the target was a symbol, for processing and decoding the symbol.

The known imaging lens assembly typically comprised a plurality of lenses of different sizes and optical powers, such as a classical Cooke triplet that allowed elimination of most of the optical distortion or color aberration at the outer edge of the lenses. The Cooke triplet typically comprised a negative flint glass lens in the center of the lens assembly with a crown glass lens on each side of the center lens. The lenses were held in a lens holder and axially arranged along an optical axis. An aperture stop having a rotationally symmetrical aperture, e.g., a circular aperture, or a non-rotationally symmetrical (or asymmetrical) aperture, e.g., a rectangular or elliptical aperture, centered on the optical axis, was typically located between one of the side glass lenses and the center glass lens. In the Cooke triplet, the sum of all the lens curvatures multiplied by the indices of refraction of the lenses was typically designed to be zero, so that the field of focus was flat (zero Petzval field curvature).

Traditionally, each lens of the Cooke triplet was made of glass for improved thermal stability, because glass has a relatively lower coefficient of thermal expansion and a relatively lower refractive index variation over temperature, as compared to plastic, for example. Hence, an all-glass lens design was typically used to minimize focal shift over an operating temperature range. To provide the known imaging lens assembly with a wide angle field of view, e.g., greater than 50 degrees, it was known to add a fourth glass spherical lens of negative optical power in front of the Cooke triplet. Sometimes, to improve the imaging performance, a fifth glass spherical lens was added.

However, the all-glass imaging lens design comprised of three, four, or five or more glass lenses was relatively heavy and expensive. It was possible to reduce the number of glass lenses by configuring aspherical surfaces on a respective glass lens. However, the manufacture of aspherical surfaces on glass lenses by machining and polishing was challenging and costly. Aspherical surfaces could be readily and inexpensively molded on a plastic lens, which was also lighter than a corresponding glass lens. Nevertheless, despite the lighter weight and lower fabrication cost of the plastic lens, the thermal instability and focal shift were unacceptable in many electro-optical reading applications.

To simultaneously achieve both effective thermal stability and effective color aberration correction, it was known to configure an imaging lens assembly by positioning a pair of plastic lenses having substantially no optical power at one side of an aperture stop, and by positioning a pair of glass lenses having substantially all the optical power of the imaging lens assembly at an opposite side of the aperture stop. The plastic lenses provided optical aberration compensation, while the glass lenses provided thermal stability.

As advantageous as this hybrid glass/plastic imaging lens assembly was, the magnitudes or absolute values of the optical powers at both sides of the aperture stop were imbalanced, because the optical power of the plastic lenses was very low, e.g., near zero, while the optical power of the glass lenses was very high. This optical imbalance made it very difficult to correct distortion and other odd aberrations, e.g., astigmatism, coma, etc. to acceptable levels. In addition, the known plastic lenses tended to be overly sensitive to manufacturing and assembly tolerances, thereby increasing the cost and time of manufacture and assembly. The field of view of the known hybrid glass/plastic lens assembly was also limited in size and was curved.

Accordingly, it would be desirable to provide a compact, lightweight and inexpensive, imaging lens assembly of high thermal stability, with minimal optical distortion or color aberration, with less sensitivity to manufacturing and assembly tolerances, and with a wider and flatter field of view, especially useful in portable and mobile applications where size, weight and cost are at a premium.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
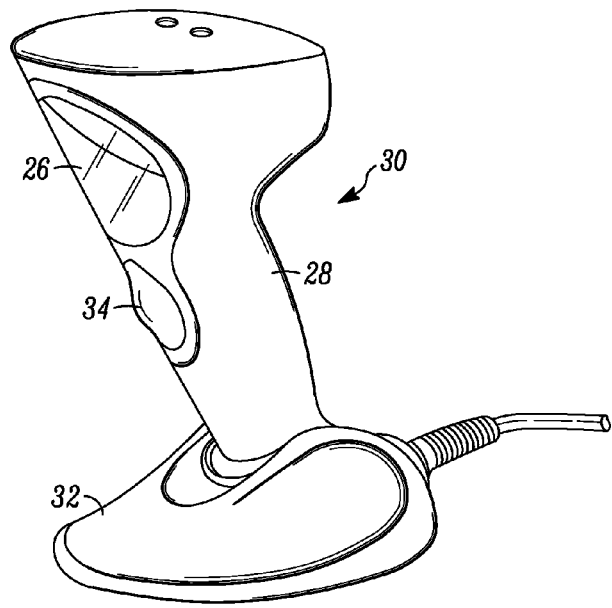
FIG. 1 is a perspective view of a portable imaging apparatus or reader operative in either a handheld mode, or a hands-free mode, for capturing return light from targets.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

In accordance with one feature of this disclosure, a hybrid imaging lens assembly captures return light from a target over a field of view of an array of image sensors of a solid-state imager, and projects the captured return light onto the array during electro-optical reading of the target. The assembly includes a pair of plastic lenses and a pair of glass lenses. One of the plastic lenses and one of the glass lenses constituting a first hybrid lens group together have a relatively low negative optical power. Another of the plastic lenses and another of the glass lenses constituting a second hybrid lens group together have a relatively high positive optical power. An aperture stop has a first side at which the first hybrid lens group is situated, an opposite second side at which the second hybrid lens group is situated, and an aperture extending along an optical axis through the opposite first and second sides. Each plastic lens has opposite aspheric nearly concentric surfaces to widen and flatten the field of view, and to reduce sensitivity to manufacturing and assembly tolerances. The aspheric nearly concentric surfaces also reduce optical distortion and odd aberrations for the imaging lens assembly. A holder holds the hybrid lens groups and the aperture stop in spaced relation along the optical axis relative to the array.

This part-plastic, part-glass, hybrid lens design is compact and achieves the above-described advantages of glass and plastic in which the glass lenses provide, among other things, substantial thermal stability and substantial color aberration correction, while the plastic lenses provide, among other things, optical aberration compensation, a lighter weight, and an easier and more cost efficient manufacture. By configuring each plastic lens with opposite aspheric nearly concentric surfaces, the field of view is widened and flattened; there is less sensitivity to manufacturing and assembly tolerances; and optical distortion and odd aberrations, e.g., astigmatism, coma, etc., for the imaging lens assembly are able to be reduced to acceptable levels below 1%.

Preferably, the one plastic lens is a negative meniscus lens of weak negative optical power, advantageously constituted of a high dispersion flint material, and is located at one end region of the holder, and the other plastic lens is a positive meniscus lens of weak positive optical power, advantageously constituted of a low dispersion crown material, and is located at an opposite end region of the holder. Each aspheric nearly concentric surface is centered at a point on the optical axis in the vicinity of the aperture, to greatly widen the field of view at both ends of the imaging lens assembly. Preferably, the one glass lens is a planoconcave or a convex-concave lens having a weak negative optical power and is constituted of a flint material, and the other glass lens is a biconvex lens having a strong positive optical power and is constituted of a crown material.

The holder has opposite open end regions. Preferably, the first hybrid lens group is inserted through one of the open end regions of the holder, and the second hybrid lens group is inserted through another of the open end regions of the holder, to simplify the assembly. Advantageously, at least one of the glass lenses of one of the hybrid lens groups makes direct surface area contact with the aperture stop.

In accordance with another feature of this disclosure, the above-described hybrid imaging lens assembly is mounted in a reader for electro-optically reading a target. The reader has a housing having a presentation area or window, and a solid-state imager in the housing. The imager has an array of image sensors having a field of view, and the hybrid imaging lens assembly is mounted in the housing, and is operative for capturing return light over the field of view from a target through the presentation area, and for projecting the captured return light onto the array during electro-optical reading of the target.

In accordance with yet another feature of this disclosure, a method of capturing return light from a target over a field of view of an array of image sensors of a solid-state imager, and of projecting the captured return light onto the array during electro-optical reading of the target, is performed by arranging a pair of plastic lenses and a pair of glass lenses along an optical axis to form an imaging lens assembly, by constituting one of the plastic lenses and one of the glass lenses as a first hybrid lens group having a relatively low negative optical power, by constituting another of the plastic lenses and another of the glass lenses as a second hybrid lens group having a relatively high positive optical power, by situating the first hybrid lens group at a first side of an aperture stop, by situating the second hybrid lens group at an opposite second side of the aperture stop, by forming an aperture along the optical axis through the opposite first and second sides of the aperture stop, by configuring each plastic lens with opposite aspheric nearly concentric surfaces to widen and flatten the field of view, to reduce sensitivity to manufacturing and assembly tolerances, and to reduce optical distortion and odd aberrations for the imaging lens assembly, and by holding the hybrid lens groups and the aperture stop in spaced relation along the optical axis relative to the array.

Turning now to the drawings, reference numeral 30 in FIG. 1 generally identifies an imaging apparatus or reader having a presentation area configured as a generally upright window 26, and a gun-shaped housing 28 supported by a base 32 for supporting the imaging reader 30 on a countertop. The imaging reader 30 can thus be used in a hands-free mode as a stationary workstation in which products are slid, swiped past, or presented to, the window 26, or can be picked up off the countertop and held in an operator's hand and used in a handheld mode in which the reader is moved, and a trigger 34 is manually depressed to initiate imaging of a target, especially one- or two-dimensional symbols, to be read at a working distance from the window 26. In another variation, the base 32 can be omitted, and housings of other configurations can be employed. For example, the housing can be configured as a vertical slot scanner having a generally vertically arranged, upright window, or as a flat-bed or horizontal slot scanner having a generally horizontally arranged window, or as a bi-optical, dual window scanner having both generally horizontally and vertically arranged windows, A cable, as illustrated in FIG. 1, connected to the base 32 can also be omitted, in which case, the reader 30 communicates with a remote host by a wireless link, and the reader 30 is electrically powered by an on-board battery.

Figure 2:
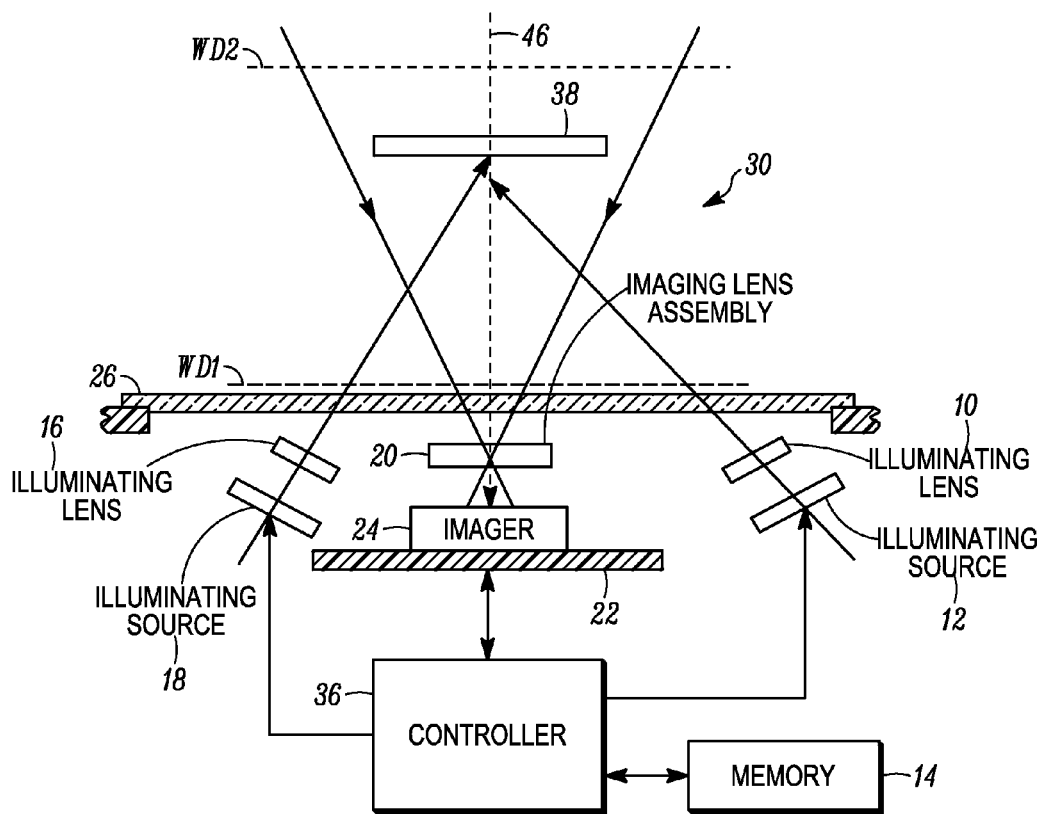
FIG. 2 is a schematic diagram of various components of the reader of FIG. 1.

As schematically shown in FIG. 2, an imager or imaging sensor 24 is mounted on a printed circuit board 22 in the reader. The imaging sensor 24 is a solid-state device, for example, a CCD or a CMOS imaging sensor having an array of addressable image sensors or pixels, preferably, but not necessarily, arranged in a single, linear, one-dimensional row along an array axis, and operative for detecting return light captured by an imaging lens assembly 20 along an optical path or optical axis 46 that extends through the window 26. The return light is scattered and/or reflected from a target or symbol 38 as pixel data over a field of view. The imaging lens assembly 20 is operative for focusing and projecting the return light onto the array of image sensors to enable the target 38 to be read. The target 38 is located anywhere in a range of working distances between a close-in working distance (WD1) and a far-out working distance (WD2). In a preferred embodiment, WD1 is about four to six inches from the imaging sensor 24, and WD2 can be many feet from the window 26, for example, around fifty feet away.

An illuminating assembly is also mounted in the imaging reader and preferably includes an illuminator or illuminating light sources 12, 18, e.g., light emitting diodes (LEDs), and corresponding illuminating lenses 10, 16 to uniformly illuminate the target 38 with an illuminating light having an intensity level over an illumination time period. The light sources 12, 18 are preferably pulsed.

As shown in FIG. 2, the imaging sensor 24 and the illuminating light sources 12, 18 are operatively connected to a controller or programmed microprocessor 36 operative for controlling the operation of these components. Preferably, the microprocessor 36 is operative for processing the return light from the target 38, and for decoding the captured target image when the target 38 is a symbol. A memory 14 is accessible by the controller 36 for storing and retrieving data.

In operation, the controller 36 sends a command signal to pulse the illuminating light sources 12, 18 for the illumination time period, say 500 microseconds or less, and energizes and exposes the imaging sensor 24 to collect light, e.g., illumination light and/or ambient light, from the target 38 during an exposure time period. A typical array needs about 16-33 milliseconds to acquire the entire target image and operates at a frame rate of about 30-60 frames per second.

Figure 3:
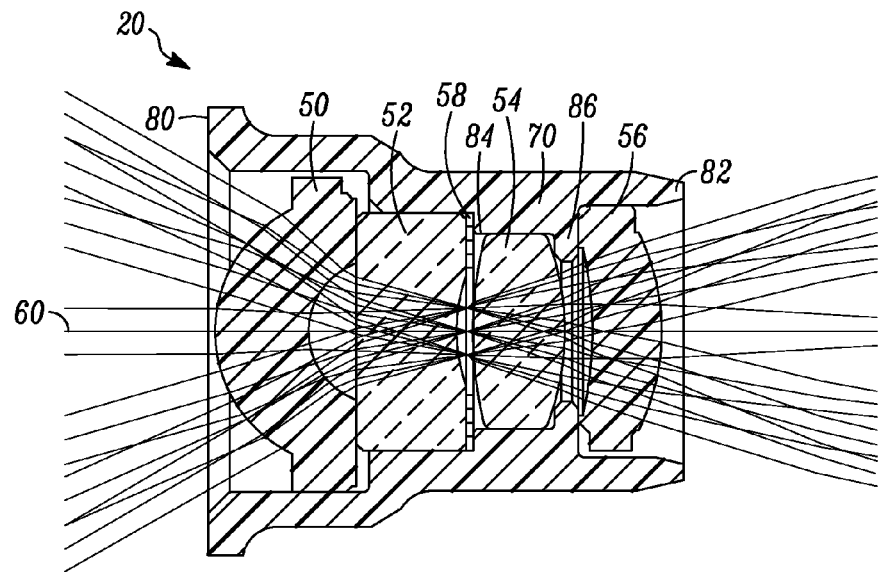
FIG. 3 is a sectional, cross-sectional view of one embodiment of an imaging lens assembly depicting ray traces in accordance with this invention for use in the reader of FIG. 1.
Figure 4:
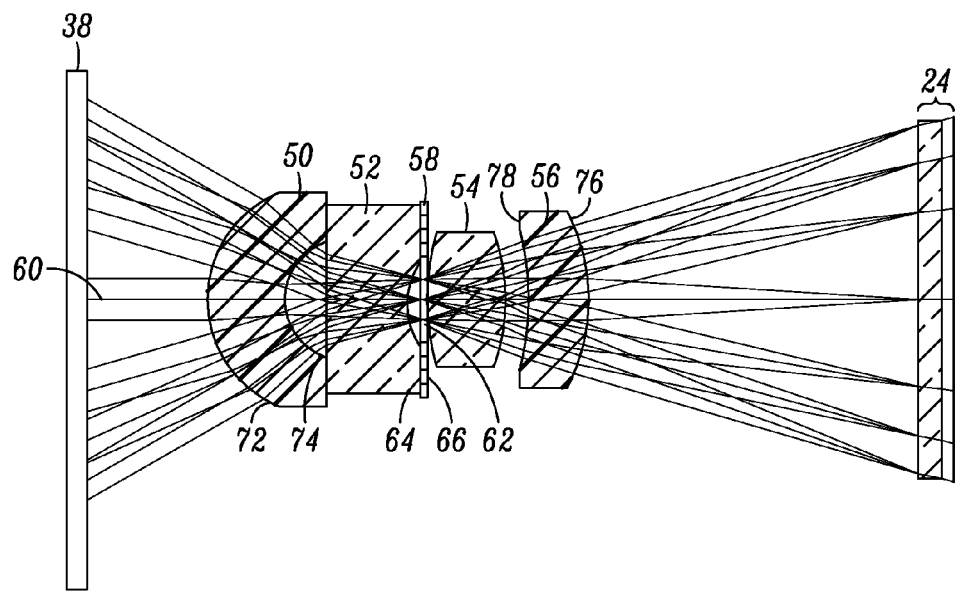
FIG. 4 is a diagrammatic side elevational view of the imaging lens assembly of FIG. 3 depicting ray traces.

In accordance with one aspect of this disclosure, as shown in the embodiment of FIGS. 3-4, the imaging lens assembly 20 provided in the reader 30 is a compact, wide angle, athermalized, achromatic, hybrid lens assembly operative for capturing return illumination light through the window 26 from the target 38 over the field of view, and for projecting the captured return illumination light from the target 38 onto the imaging sensor 24 during electro-optical reading of the target 38. The hybrid assembly 20 includes a pair of plastic lenses 50, 56, and a pair of glass lenses 52, 54. The hybrid assembly 20 also includes an aperture stop 58. The lenses 50, 52, 54 and 56 are successively arranged in a row, in that order, along an imaging axis 60. The plastic lenses 50, 56 are located at opposite ends of the row, and the glass lenses 52, 54 are located in the middle of the row. The aperture stop 58 is located between the glass lenses 52, 54. A holder 70 holds the lenses 50, 52, 54 and 56 and the aperture stop 58 in spaced relation along the imaging axis 60 relative to the array of the imaging sensor 24.

The plastic lens 50 and the glass lens 52 constitute a first hybrid lens group having a relatively low negative optical power. The plastic lens 56 and the glass lens 54 constitute a second hybrid lens group having a relatively high positive optical power. As best seen in FIG. 4, the aperture stop 58 has a first side 64 at which the first hybrid lens group is situated, an opposite second side 66 at which the second hybrid lens group is situated, and an aperture 62 extending along the imaging axis 60 through the opposite first and second sides 64, 66.

The plastic lens 50 is a negative meniscus lens of weak negative optical power, advantageously constituted of a high dispersion flint material, e.g., polycarbonate, and has a relatively low Abbe number, e.g., about 25, and has aspheric nearly concentric surfaces 72, 74 centered at a point on the imaging axis 60 in the vicinity of the aperture 62, to greatly widen (e.g., greater than 62 degrees) and flatten the field of view curvature at the end of the imaging lens assembly 20 at which the plastic lens 52 is located. The Abbe number is a measure of a lens material's dispersion (variation of refractive index with wavelength) in relation to its refractive index. The aspheric nearly concentric surfaces 72, 74 also reduce sensitivity to manufacturing and assembly tolerances for the imaging lens assembly 20.

The plastic lens 56 is a positive meniscus lens of weak positive optical power, advantageously constituted of a low dispersion crown material, e.g., Zeonex (trademark), and has a relatively high Abbe number, e.g., about 56, and has aspheric nearly concentric surfaces 76, 78 centered at a point on the imaging axis 60 in the vicinity of the aperture 62, to widen and flatten the field of view at the end of the imaging lens assembly 20 at which the plastic lens 56 is located. The aspheric nearly concentric surfaces 76, 78 also reduce sensitivity to manufacturing and assembly tolerances for the imaging lens assembly 20.

Since the nearly concentric surfaces 72, 74, 76, 78 are substantially concentric with the aperture stop, they contribute very little to chromatic aberration. Any residual color is corrected by the difference in the Abbe numbers of the plastic lenses 50, 56. Since both plastic lenses 50, 56 have weak or negligible optical power, they behave like a parallel plate, and are not sensitive, or otherwise much less sensitive, to critical manufacturing or assembly tolerances, such as lens surface decenters and/or tilts.

The glass lens 52 is a planoconcave lens having a relatively low negative optical power and is constituted of a flint material, and has a relatively low Abbe number, e.g., about 25. The glass lens 54 is a biconvex lens having a relatively high positive optical power and is constituted of a crown material, and has a relatively high Abbe number, e.g., about 56. The glass lenses 52, 56 are achromatized with the large difference in their Abbe numbers and with the large difference in their optical powers. This provides the imaging lens assembly 20 with a superior color correction.

In a preferred embodiment, the effective focal length of the imaging lens assembly 20 is 5.3 mm; the entrance pupil diameter is 0.8 mm (so that the focal number is 6.63); the field of view, as measured along the diagonal, is 62 degrees. The total focus shift from −30EC to +70EC is 23 micrometers or 0.4% of the focal length. The imaging lens assembly 20 has a compact short length that is less than 10 mm.

The holder 70 is a tubular optical barrel and has opposite open end regions 80, 82, as well as a pair of interior annular flanges 84, 86 (see FIG. 3). In one embodiment, as depicted in FIG. 3, the glass lens 54 is initially inserted through the open end region 80 of the holder 70 until the glass lens 54 abuts against one side of the flange 86. Then, the aperture stop 58 is inserted through the open end region 80 of the holder 70 until the aperture stop 58 abuts against the flange 84. Then, the glass lens 52 is inserted through the open end region 80 of the holder 70 until the glass lens 52 abuts against the aperture stop 58. Then, the plastic lens 50 is inserted through the open end region 80 of the holder 70 until the plastic lens 50 abuts against the glass lens 52. Advantageously, the plastic lens 50 has an outer planar inner surface portion that makes direct surface-to-surface contact with the planar surface of the glass lens 52. The glass lens 52 and the plastic lens 50, either with or without the aperture stop 58, could also be simultaneously inserted through the open end region 80 of the holder 70. Then, the plastic lens 56 is inserted through the open end region 82 of the holder 70 until the plastic lens 56 abuts against the opposite side of the flange 86.

Figure 5:
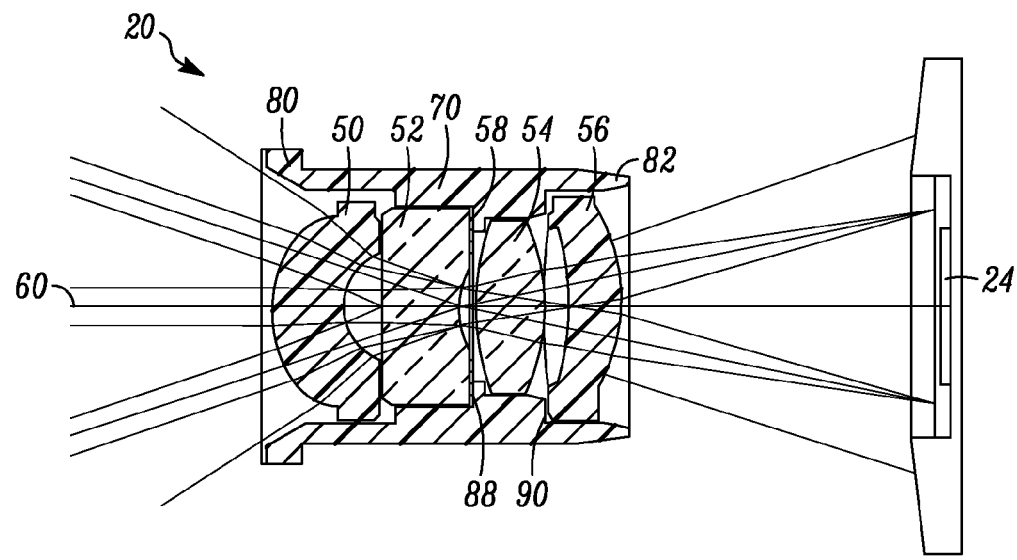
FIG. 5 is a sectional, cross-sectional view of another embodiment of an imaging lens assembly depicting ray traces in accordance with this invention for use in the reader of FIG. 1.

FIG. 5 depicts a modified holder 70 having a pair of interior annular flanges 88, 90, as well as an alternate mounting of the components of the imaging lens assembly 20. The aperture stop 58 is initially inserted through the open end region 80 of the holder 70 until the aperture stop 58 abuts against one side of the flange 88. Then, the glass lens 52 is inserted through the open end region 80 of the holder 70 until the glass lens 52 abuts against the aperture stop 58. Then, the plastic lens 50 is inserted through the open end region 80 of the holder 70 until the plastic lens 50 abuts against the glass lens 52. Advantageously, the plastic lens 50 has an outer planar inner surface portion that makes direct surface-to-surface contact with the planar surface of the glass lens 52. The glass lens 52 and the plastic lens 50, either with or without the aperture stop 58, could also be simultaneously inserted through the open end region 80 of the holder 70. Then, the glass lens 54 is inserted through the open end region 82 of the holder 70 until the glass lens 54 abuts against the opposite side of the flange 88. Then, the plastic lens 56 is inserted through the open end region 82 of the holder 70 until the plastic lens 56 abuts against the flange 90. This alternate mounting in which a plastic lens and a glass lens are inserted through a respective open end region of the holder 70 is more symmetrically performed from both ends of the holder, is easier to perform, and better resists misalignment among the components.

Figure 6:
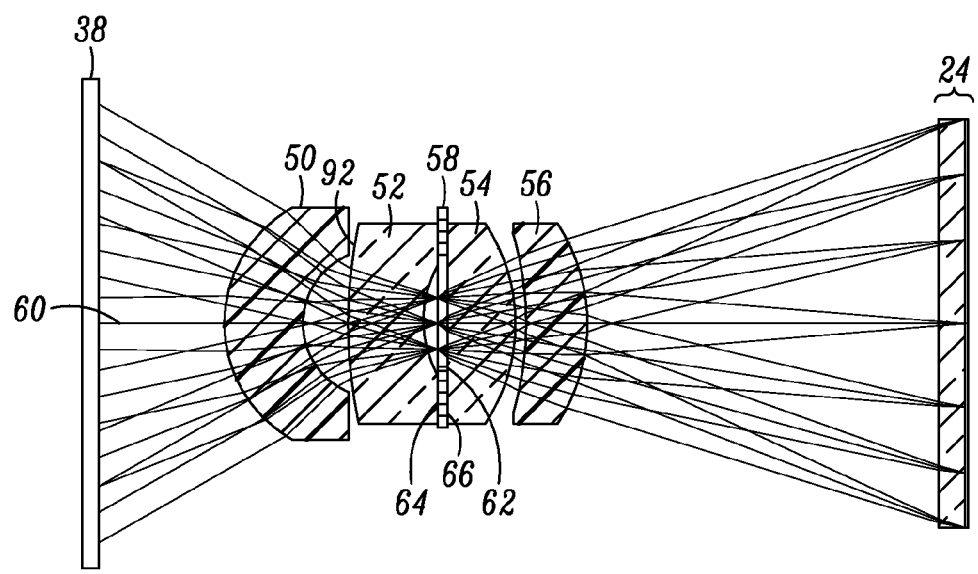
FIG. 6 is a diagrammatic side elevational view of a preferred embodiment of an imaging lens assembly depicting ray traces and modified from that of FIG. 3.

FIG. 6 is the same as FIG. 4, except that the glass lens 52 is convex-concave, i.e., the front surface 92 is convex, so that the angle of incidence of each ray bending through the plastic lens 50 is reduced, and the light loss due to large angle between the angle of incidence and the angle of exitance on its surfaces (relative illumination) can be improved. In this variation, the plastic lens 50 can be mounted directly on an interior flange of the holder 70, rather than on the glass lens 52. The embodiment of FIG. 6 is currently preferred over the embodiment of FIG. 4.

The aperture stop 58 may be configured as a discrete optical component, or may be integrally molded with the holder 70. The aperture 62 may be asymmetrical, e.g., a rectangular or elliptical aperture, or symmetrical, e.g., circular. If the imaging sensor 24 is a linear sensor that extends along an array axis, and if the aperture is asymmetrical, then the aperture 62 needs to be aligned relative to the imaging sensor 24 such that the long dimension of the asymmetrical aperture extends along a direction generally perpendicular to the elongation (array axis) of the imaging sensor 24. There may be an air gap or spacing between the aperture stop 58 and the glass lens 54. Preferably, the aperture stop 58 is in direct surface contact with the glass lens 52. The lenses 52, 54, 56, and 58 and the aperture stop 58 are all fixed in place, preferably with an adhesive bond, within the holder 70.

It will be understood that each of the elements described above, or two or more together, also may find a useful application in other types of constructions differing from the types described above.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A hybrid imaging lens assembly for capturing return light from a target over a field of view of an array of image sensors of a solid-state imager, and for projecting the captured return light onto the array during electro-optical reading of the target, the assembly comprising:
   a pair of plastic lenses;
   a pair of glass lenses;
   one of the plastic lenses and one of the glass lenses constituting a first hybrid lens group together having a relatively low negative optical power;
   another of the plastic lenses and another of the glass lenses constituting a second hybrid lens group together having a relatively high positive optical power;
   an aperture stop having a first side at which the first hybrid lens group is situated, an opposite second side at which the second hybrid lens group is situated, and an aperture extending along an optical axis through the opposite first and second sides;
   each plastic lens having opposite aspheric nearly concentric surfaces to widen and flatten the field of view, to reduce sensitivity to manufacturing and assembly tolerances, and to reduce optical distortion and odd aberrations for the imaging lens assembly; and
   a holder for holding the hybrid lens groups and the aperture stop in spaced relation along the optical axis relative to the array.

2. The assembly of claim 1, wherein each aspheric nearly concentric surface is centered at a point on the optical axis in the vicinity of the aperture.

3. The assembly of claim 1, wherein the one plastic lens is a negative meniscus lens of weak negative optical power and is located at one end region of the holder, and wherein the other plastic lens is a positive meniscus lens of weak positive optical power and is located at an opposite end region of the holder.

4. The assembly of claim 3, wherein the negative meniscus lens is constituted of a high dispersion flint material, and wherein the positive meniscus lens lenses is constituted of a low dispersion crown material.

5. The assembly of claim 1, wherein the one glass lens is a planoconcave or a convex-concave lens having a weak negative optical power and constituted of a flint material, and wherein the other glass lens is a biconvex lens having a strong positive optical power and constituted of a crown material.

6. The assembly of claim 1, wherein the aperture stop is a discrete optical component separate from the holder and is in direct surface area contact with at least one of the glass lenses of one of the hybrid lens groups.

7. A hybrid imaging lens assembly for capturing return light from a target over a field of view of an array of image sensors of a solid-state imager, and for projecting the captured return light onto the array during electro-optical reading of the target, the assembly comprising:
   a pair of plastic lenses;
   a pair of glass lenses;
   one of the plastic lenses and one of the glass lenses constituting a first hybrid lens group together having a relatively low negative optical power;
   another of the plastic lenses and another of the glass lenses constituting a second hybrid lens group together having a relatively high positive optical power;
   an aperture stop having a first side at which the first hybrid lens group is situated, an opposite second side at which the second hybrid lens group is situated, and an aperture extending along an optical axis through the opposite first and second sides;
   each plastic lens having opposite aspheric nearly concentric surfaces to widen and flatten the field of view, to reduce sensitivity to manufacturing and assembly tolerances, and to reduce optical distortion and odd aberrations for the imaging lens assembly;
   a holder for holding the hybrid lens groups and the aperture stop in spaced relation along the optical axis relative to the array; and
   wherein the holder has opposite open end regions, wherein the first hybrid lens group enters the holder through one of the open end regions, and wherein the second hybrid lens group enters the holder through another of the open end regions.

8. A reader for electro-optically reading a target, comprising:
a housing having a presentation area;
a solid-state imager in the housing and including an array of image sensors having a field of view; and
a hybrid imaging lens assembly in the housing, for capturing return light over the field of view from the target through the presentation area, and for projecting the captured return light onto the array during electro-optical reading of the target, the assembly including a pair of plastic lenses, a pair of glass lenses, one of the plastic lenses and one of the glass lenses constituting a first hybrid lens group together having a relatively low negative optical power, another of the plastic lenses and another of the glass lenses constituting a second hybrid lens group together having a relatively high positive optical power, an aperture stop having a first side at which the first hybrid lens group is situated, an opposite second side at which the second hybrid lens group is situated, and an aperture extending along an optical axis through the opposite first and second sides, each plastic lens having opposite aspheric nearly concentric surfaces to widen and flatten the field of view, to reduce sensitivity to manufacturing and assembly tolerances, and to reduce optical distortion and odd aberrations for the imaging lens assembly, and a holder for holding the hybrid lens groups and the aperture stop in spaced relation along the optical axis relative to the array.

9. The reader of claim 8, wherein each aspheric nearly concentric surface is centered at a point on the optical axis in the vicinity of the aperture.

10. The reader of claim 8, wherein the one plastic lens is a negative meniscus lens of weak negative optical power and is located at one end region of the holder, and wherein the other plastic lens is a positive meniscus lens of weak positive optical power and is located at an opposite end region of the holder.

11. The reader of claim 10, wherein the negative meniscus lens is constituted of a high dispersion flint material, and wherein the positive meniscus lens lenses is constituted of a low dispersion crown material.

12. The reader of claim 8, wherein the one glass lens is a planoconcave or a convex-concave lens having a weak negative optical power and constituted of a flint material, and wherein the other glass lens is a biconvex lens having a strong positive optical power and constituted of a crown material.

13. The reader of claim 8, wherein the aperture stop is a discrete optical component separate from the holder and is in direct surface area contact with at least one of the glass lenses of one of the hybrid lens groups.

14. A reader for electro-optically reading a target, comprising:
a housing having a presentation area;
a solid-state imager in the housing and including an array of image sensors having a field of view;
a hybrid imaging lens assembly in the housing, for capturing return light over the field of view from the target through the presentation area, and for projecting the captured return light onto the array during electro-optical reading of the target, the assembly including a pair of plastic lenses, a pair of glass lenses, one of the plastic lenses and one of the glass lenses constituting a first hybrid lens group together having a relatively low negative optical power, another of the plastic lenses and another of the glass lenses constituting a second hybrid lens group together having a relatively high positive optical power, an aperture stop having a first side at which the first hybrid lens group is situated, an opposite second side at which the second hybrid lens group is situated, and an aperture extending along an optical axis through the opposite first and second sides, each plastic lens having opposite aspheric nearly concentric surfaces to widen and flatten the field of view, to reduce sensitivity to manufacturing and assembly tolerances, and to reduce optical distortion and odd aberrations for the imaging lens assembly, and a holder for holding the hybrid lens groups and the aperture stop in spaced relation along the optical axis relative to the array; and
wherein the holder has opposite open end regions, wherein the first hybrid lens group enters the holder through one of the open end regions, and wherein the second hybrid lens group enters the holder through another of the open end regions.

15. A method of capturing return light from a target over a field of view of an array of image sensors of a solid-state imager, and of projecting the captured return light onto the array during electro-optical reading of the target, the method comprising:
arranging a pair of plastic lenses and a pair of glass lenses along an optical axis to form an imaging lens assembly;
constituting one of the plastic lenses and one of the glass lenses as a first hybrid lens group having a relatively low negative optical power;
constituting another of the plastic lenses and another of the glass lenses as a second hybrid lens group having a relatively high positive optical power;
situating the first hybrid lens group at a first side of an aperture stop;
situating the second hybrid lens group at an opposite second side of the aperture stop;
forming an aperture along the optical axis through the opposite first and second sides of the aperture stop;
configuring each plastic lens with opposite aspheric nearly concentric surfaces to widen and flatten the field of view, to reduce sensitivity to manufacturing and assembly tolerances, and to reduce optical distortion and odd aberrations for the imaging lens assembly;
holding the hybrid lens groups and the aperture stop in spaced relation along the optical axis relative to the array; and
wherein the holding is performed by inserting the first hybrid lens group through one open end region of a holder, and by inserting second first hybrid lens group through another open end region of the holder.

16. The method of claim 15, and configuring each aspheric nearly concentric surface to be centered at a point on the optical axis in the vicinity of the aperture.

17. The method of claim 15, and configuring the one plastic lens as a negative meniscus lens, and configuring the other plastic lens as a positive meniscus lens.

18. The method of claim 15, wherein the inserting is performed until at least one of the glass lenses of one of the hybrid lens group is in direct surface area contact with the aperture stop.

* * * * *